(No Model.)
J. FISCHER.
HARNESS LOOP.
No. 375,277. Patented Dec. 20, 1887.
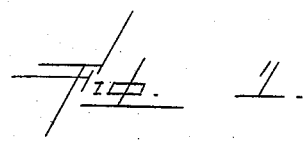
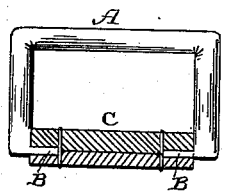
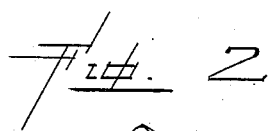
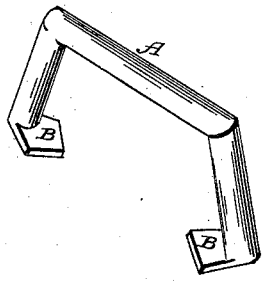
Witnesses
L. H. Gardner
Edm. P. Ellis
Inventor
John Fischer,
per J. A. Lehmann,
Atty.
N. PETERS, Photo-Lithographer, Washington, D. C.

UNITED STATES PATENT OFFICE.

JOHN FISCHER, OF LOUISVILLE, KENTUCKY.

HARNESS-LOOP.

SPECIFICATION forming part of Letters Patent No. 375,277, dated December 20, 1887.

Application filed March 31, 1887. Serial No. 233,191. (No model.)

*To all whom it may concern:*

Be it known that I, JOHN FISCHER, of Louisville, in the county of Jefferson and State of Kentucky, have invented certain new and useful Improvements in Harness-Loops; and I do hereby declare the following to be a full, clear, and exact description of the invention, such as will enable others skilled in the art to which it pertains to make and use it, reference being had to the accompanying drawings, which form part of this specification.

My invention relates to an improvement in harness-loops; and it consists of a metallic loop having sharp-pointed ends, which extend horizontally inward toward each other, and which can be forced into the sides of the piece of harness after the sewing has been done without in any wise injuring any of the stitches, as will be more fully described hereinafter.

The object of my invention is to provide a loop which can be applied at any desired point of the finished harness, and that without injuring the same in any manner.

Figure 1 is a vertical section of a piece of harness taken at one side of the loop. Fig. 2 is a perspective of the loop ready to be attached to the harness.

A represents the loop, which is made of some malleable metal, and which has its two ends, B, turned inward toward each other, so as to enter opposite sides of the piece of harness C, as shown in Fig. 1. These ends are flattened outward, so as to be wider than any other portion of the loop when the loop is narrow; but when the loop is made of wide metal the ends need not be widened, and the ends are made V-shaped, so that the points can be made as sharp as desired.

The loop is applied to the piece of harness so that its ends pass down over opposite edges, and then these ends are forced inward toward each other, so that their points enter between the edges of the two pieces out of which the piece of harness is formed. These sharp points enter between the edges of the harness just far enough to hold the loop rigidly in position without in any wise cutting the stitches or doing the piece of harness any harm whatever.

Heretofore metallic loops have been applied to harnesses; but their ends have been so shaped that the harness could only be sewed or finished after the loops were placed in position. My invention differs from this in being able to apply the loop to any part of the harness after it has been finished. When so desired, the loops can have their ends open outward and removed from one place to be attached to another, which cannot be done with those loops which can only be applied before the harness has been completed.

Having described my invention, I claim—

A metallic harness-loop having the top bar, vertical side bars, and substantially triangular flattened and pointed ends B, which are turned horizontally inward toward each other, and which are adapted to catch in opposite edges of a finished portion of the harness without injuring the seams, substantially as shown.

In testimony whereof I affix my signature in presence of two witnesses.

JOHN FISCHER.

Witnesses:
ARNOLD KELLER,
JOHN HAUTH.